United States Patent
Bernauer et al.

(10) Patent No.: US 10,439,419 B2
(45) Date of Patent: Oct. 8, 2019

(54) ADAPTIVE BATTERY CHARGING METHOD AND SYSTEM

(71) Applicant: Philip Morris Products S.A., Neuchatel (CH)

(72) Inventors: Dominique Bernauer, Neuchatel (CH); Yannick Butin, Marin-Epagnier (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/518,113

(22) PCT Filed: Oct. 27, 2015

(86) PCT No.: PCT/EP2015/074846
§ 371 (c)(1),
(2) Date: Apr. 10, 2017

(87) PCT Pub. No.: WO2016/066632
PCT Pub. Date: May 6, 2016

(65) Prior Publication Data
US 2017/0302089 A1  Oct. 19, 2017

(30) Foreign Application Priority Data
Oct. 28, 2014 (EP) .................................. 14190759

(51) Int. Cl.
*A24F 11/00* (2006.01)
*A24F 47/00* (2006.01)
(Continued)

(52) U.S. Cl.
CPC ............ *H02J 7/007* (2013.01); *A24F 47/008* (2013.01); *H01M 10/0525* (2013.01);
(Continued)

(58) Field of Classification Search
CPC .................................. H02J 7/00; A24F 47/00
(Continued)

(56) References Cited

U.S. PATENT DOCUMENTS 5,217,379 A * 6/1993 Kirschenbaum ....... A61B 5/486
131/270
8,513,919 B2   8/2013 Bhardwaj et al.
(Continued)

FOREIGN PATENT DOCUMENTS

CN   101467323 A   6/2009
CN   203660588 U   6/2014
(Continued)

OTHER PUBLICATIONS

International Search Report and Written Opinion dated Jan. 20, 2016 in PCT/EP2015/074846 filed, Oct. 27, 2015.
(Continued)

*Primary Examiner* — Abdullah A Riyami
*Assistant Examiner* — Thang H Nguyen
(74) *Attorney, Agent, or Firm* — Oblon, McClelland, Maier & Neustadt, L.L.P.

(57) ABSTRACT

A method of charging a second battery in an electronic smoking device from a first battery in a charging device is provided, including: comparing an output voltage of the first battery with a threshold voltage; and when the output voltage is equal to or greater than the threshold voltage, charging the second battery using a first current; and when the output voltage is less than the threshold voltage, reducing the first current until the output voltage is equal to or greater than a second threshold voltage. A charging device is also provided, including control circuitry configured to control charging of the secondary battery.

12 Claims, 4 Drawing Sheets

(51) Int. Cl.
*A24F 13/00* (2006.01)
*A24F 17/00* (2006.01)
*A24F 25/00* (2006.01)
*H02J 7/00* (2006.01)
*H01M 10/0525* (2010.01)
*H01M 10/44* (2006.01)
*H01M 10/42* (2006.01)

(52) U.S. Cl.
CPC ........... *H01M 10/42* (2013.01); *H01M 10/44* (2013.01); *H02J 7/008* (2013.01); *H02J 7/0054* (2013.01); *H02J 7/0077* (2013.01); *H01M 2010/4271* (2013.01); *H01M 2220/30* (2013.01)

(58) Field of Classification Search
USPC .................................................. 131/328, 329
See application file for complete search history.

(56) References Cited

U.S. PATENT DOCUMENTS

| | | | |
|---|---|---|---|
| 2006/0061332 A1* | 3/2006 | Neu | G06F 1/1632 320/132 |
| 2006/0208695 A1* | 9/2006 | Weinstein | H01M 2/1022 320/110 |
| 2009/0159330 A1 | 6/2009 | Weinstein et al. | |
| 2010/0134072 A1 | 6/2010 | Neu et al. | |
| 2010/0211340 A1 | 8/2010 | Lowenthal et al. | |
| 2010/0244782 A1* | 9/2010 | Nagayama | H01M 10/44 320/162 |
| 2012/0305662 A1 | 12/2012 | Miyano | |
| 2015/0181942 A1* | 7/2015 | Holzherr | A24F 47/008 131/328 |
| 2015/0245662 A1* | 9/2015 | Memari | A24F 15/12 131/328 |
| 2015/0272223 A1* | 10/2015 | Weigensberg | A24F 47/008 131/328 |
| 2016/0374397 A1* | 12/2016 | Jordan | A24F 47/008 131/329 |

FOREIGN PATENT DOCUMENTS

| | | |
|---|---|---|
| EP | 2 110 033 A1 | 10/2009 |
| GB | 2 332 824 A | 6/1999 |
| RU | 2121196 C1 | 10/1998 |
| TW | M466420 | 11/2013 |
| WO | WO 93/05559 A1 | 3/1993 |

OTHER PUBLICATIONS

"Anker Astro 3E 10000mAh External Battery", Anker, https://web.archive.org/web/20140723003323/http:/www.ianker.com/support-c1-g97.html, received by client on Dec. 30, 2013, publication date unknown, 4 pages.

Russian Office Action and Search Report with English translation dated Feb. 20, 2019 in corresponding Russian Patent Application No. 2017117680, citing documents AO-AQ therein (12 pages).

Chinese Office Action and Search Report with English translation dated Apr. 8, 2019 in corresponding Taiwanese Patent Application No. 104132825, citing documents AO-Q therein (15 pages).

Philippine Office Action dated Apr. 1, 2019 in corresponding Philippine Patent Application No. 1-2016-502579, Citing documents AA-AC therein (4 pages).

\* cited by examiner

ADAPTIVE BATTERY CHARGING METHOD AND SYSTEM

TECHNICAL FIELD

The disclosure relates to systems that use one battery to recharge another battery, and is particularly advantageous for charging a lithium ion battery from another battery.

DESCRIPTION OF THE RELATED ART

Lithium ion batteries are typically charged using a constant current phase followed by a constant voltage phase. In the constant current phase, the voltage across the secondary battery is adjusted to maintain a constant maximum charging current $I_{ch}$ until the voltage across the battery reaches a defined voltage limit $V_{ch}$, with $I_{ch}$ and $V_{ch}$ set by the properties of the battery. In the constant voltage phase the voltage across the battery is maintained at a fixed value $V_{ch}$ until the current drops below a predetermined value $I_{low}$. For rapid charging it is desirable to maximise the length of the constant current phase.

As the second battery charges in the constant current phase, the charging voltage must increase to compensate for the increasing voltage of the second battery. The constant current phase accordingly requires a minimum charging voltage to be available from the charging battery.

In a battery to battery charging system, as the charging battery ages, its internal resistance increases and as a result the voltage that it can deliver is reduced. When it can no longer deliver the minimum voltage required for the fast charging operation it must be recharged or replaced.

BRIEF DESCRIPTION OF DRAWINGS

Embodiments will now be further described, by the way of example only, with reference to the accompanying drawings in which.

DETAILED DESCRIPTIPON

Figure 1:
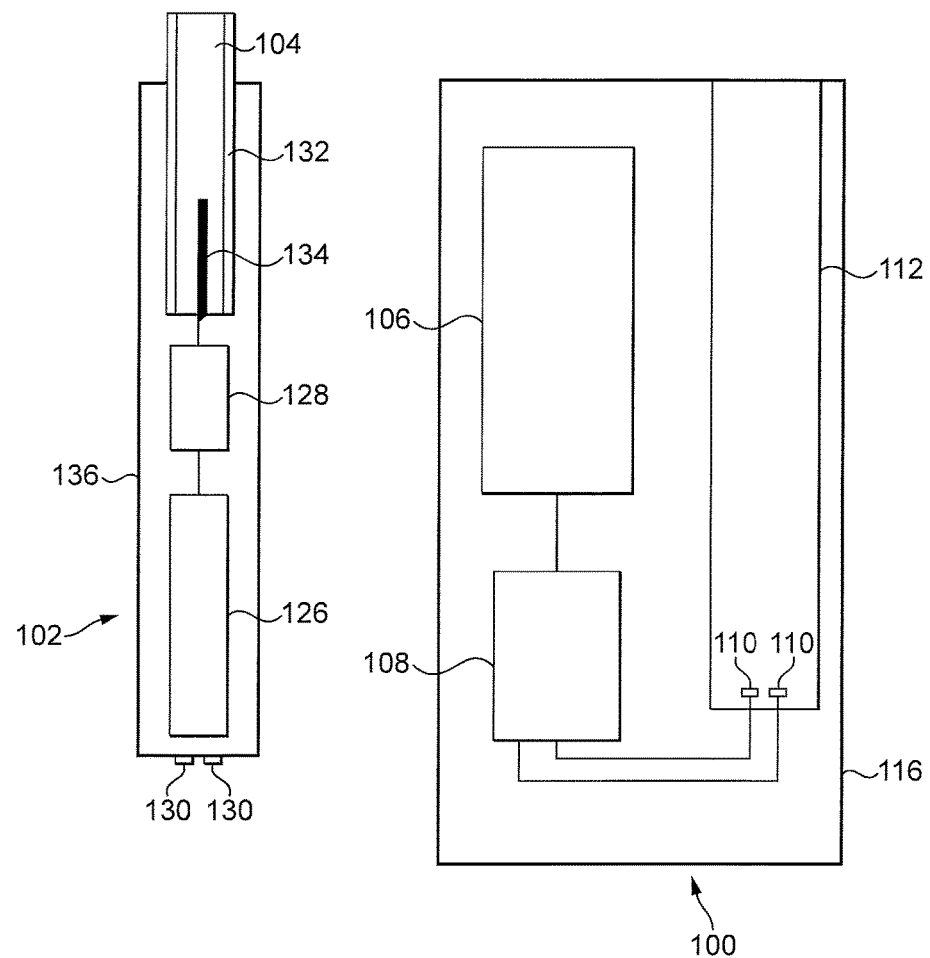
FIG. 1 is a schematic illustration of an handheld battery operated smoking device and an associated charging device including a charging battery.

It is an object of the invention to provide a battery to battery charging system that can provide for fast charging but which can support an increased number of charging cycles before the charging battery needs to be recharged or replaced, when compared with the systems currently available.

In a first aspect of the invention, there is provided a method of charging a second battery from a first battery, comprising the steps of:

comparing an output voltage of the first battery with a threshold voltage; and when the output voltage from the first battery is equal to or greater than the threshold voltage, charging the second battery using a first current; and when the output voltage from the first battery is less than the threshold voltage, reducing the first current.

The first current may be reduced until the output voltage of the first battery is equal to or greater than a second threshold voltage. The second threshold voltage may be equal to the first threshold voltage or may be different to the first threshold voltage.

The step of reducing the current may comprise reducing the duty cycle of voltage pulses applied to a power converter connected between the first battery and the second battery.

The step of comparing may be carried out iteratively during charging of the second battery. The step of reducing may comprise not applying a voltage pulse to a power converter connected between the first battery and the second battery following the outcome of the step of comparing.

The step of reducing the current may comprise reducing the frequency at which pulses of electrical current are applied to the second battery.

The method may comprise, when the output voltage from the first battery is equal to or greater than the threshold voltage, charging the second battery using a constant first current, and reducing the charging current when either the charging voltage applied to the second battery reaches a maximum permitted voltage or the output voltage from the first battery is less than the threshold voltage.

When the charging voltage applied to the second battery reaches a maximum permitted voltage or the output voltage from the first battery is less than the threshold voltage, the charging current may be reduced to maintain the charging voltage applied to the first battery at or close to the maximum permitted voltage.

The method may comprise stopping the charging of the second battery when the charging current is reduced to a current less than or equal to a minimum current threshold.

The second battery may be a lithium ion battery.

In a second aspect of the invention, there is provided a charging device comprising:

a first battery configured to charge a secondary battery connected to the device, and control circuitry configured to control charging of the secondary battery, wherein the control circuitry is configured to:

compare an output voltage of the first battery with a threshold voltage; and if the output voltage from the first battery is equal to or greater than the threshold voltage, charge the second battery using a first current; and if the output voltage from the first battery from the first battery is less than the threshold voltage, reduce the first current.

The control circuitry may be configured to reduce the first current until the output voltage of the first battery is equal to or greater than a second threshold voltage. The second threshold voltage may be equal to the first threshold voltage or may be different to the first threshold voltage.

The charging device may comprise a power converter connected between the first battery and the second battery, and the control circuitry may configured to reduce the first current by reducing the duty cycle of voltage pulses applied to the power converter from the first battery.

The control circuitry may be configured to compare the output voltage of the first battery with the threshold voltage periodically during charging of the second battery. The control circuitry may be configured to reduce the first current by not applying a pulse of voltage to a power converter connected between the first battery and the second battery following the outcome of the step of comparing.

The control circuitry may be configured, when the output voltage from the first battery is equal to or greater than the threshold voltage, to charge the second battery using a constant first current, and reduce the charging current when either the charging voltage applied to the second battery reaches a maximum permitted voltage or the output voltage from the first battery is less than the threshold voltage.

When the charging voltage applied to the second battery reaches a maximum permitted voltage or the output voltage from the first battery is less than the threshold voltage, the control circuitry may be configured to reduce the charging current to maintain the charging voltage applied to the first battery at or close to the maximum permitted voltage.

The control circuitry may be configured to stop the charging of the second battery when the charging current is reduced to a current less than or equal to a minimum current threshold.

The second battery may be a lithium ion battery. The first battery may be a lithium ion battery.

The method and charging device in accordance with the first and second aspects of the disclosure may be applied to electronic smoking systems. The charging device may be used to charge a secondary battery in an electronic smoking device. The electronic smoking device may include an electrically powered heater configured to heat an aerosol-forming substrate. The aerosol-forming substrate may be provided in the form of a cigarette having a mouthpiece portion on which an end user inhales. The secondary battery may advantageously provide sufficient power for a single smoking session, exhausting a single aerosol-forming substrate.

A short recharging time is crucial for the acceptance of electronic cigarettes. However, it is undesirable for a user to be unable to charge the smoking device simply because it cannot be achieved at the maximum possible speed. The method and charging device of the present invention allows for additional charging cycles of the electronic smoking device even as the battery of the charging device ages and deteriorates. The charging device may be a handheld charging device designed to be carried easily with a pocket or bag of a user.

In a third aspect of the invention, there is provided a computer program, that when executed on a processor in a charging device, the charging device having a first battery configured to charge a secondary battery connected to the device, and the processor being configured to control charging of the secondary battery, causes the processor to carry out the steps of the first aspect of the invention.

In a fourth aspect of the invention, there is provided a computer readable storage medium having stored thereon a computer program according to the third aspect.

It should be clear that features described in relation to one aspect of the disclosure may be applied to other aspects of the disclosure, alone or in combination with other described aspects and features of the disclosure.

FIG. 1 shows a primary device 100 and a secondary device 102. The primary device 100 in this example is a charging unit for an electrically heated smoking system. The secondary device 102 in this example is an electrically heated aerosol-generating device adapted to receive a smoking article 104 comprising an aerosol-forming substrate. The secondary device includes a heater to heat the aerosol forming substrate in operation. The user inhales on a mouthpiece portion of the smoking article 104 to draw aerosol into the user's mouth. The secondary device 102 is configured to be received within a cavity 112 in the primary device 100 in order to recharge the power supply in the secondary device.

The primary device 100 comprises first battery 106, control electronics 108, and electrical contacts 110 configured to provide electrical power from the first battery 106 to a second battery in the secondary device when the secondary device is in connection with the electrical contacts 110. The electrical contacts 110 are provided adjacent the bottom of a cavity 112. The cavity is configured to receive the secondary device 102. The components of the primary device 100 are housed within the housing 116.

The secondary device 102 comprises a second battery 126, secondary control electronics 128 and electrical contacts 130. As described above, the second, rechargeable battery 126 of the secondary device 102 is configured to receive a supply of power from the first battery 106 when the electrical contacts 130 are in contact with the electrical contacts 110 of the primary device 100. The secondary device 102 further comprises a cavity 132 configured to receive the smoking article 104. A heater 134, in the form of, for example, a blade heater, is provided at the bottom of the cavity 132. In use, the user activates the secondary device 102, and power is provided from the battery 126 via the control electronics 128 to the heater 134. The heater is heated to a standard operational temperature that is sufficient to generate an aerosol from the aerosol-forming substrate of the aerosol-generating article 104. The components of the secondary device 102 are housed within the housing 136. A secondary device of this type is described more fully in EP2110033 for example.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. Alternatively, the aerosol-forming substrate may be a liquid substrate and the smoking article may comprise means for retaining the liquid substrate.

In this example, the secondary device 102 is an electrically heated smoking device. As such the secondary device 102 is small (conventional cigarette size) but must deliver high power over a period of just a few minutes, typically around 7 minutes for a single smoking session. The second battery may then need to be returned to the primary device 100 for recharging. Recharging is desirably completed, at least to a level sufficient to allow for another complete smoking experience, in a matter of a few minutes and preferably less than 6 minutes.

The first battery 106 in the primary device is configured to hold sufficient charge to recharge the second battery 126 several times before needing recharging itself. This provides the user with a portable system that allows for several smoking sessions before recharging from a mains outlet is required.

In order to satisfy the competing requirements for the second battery 126 of small size, sufficient capacity and safe, but fast, charge and discharge, as well as acceptable lifetime, a lithium iron phosphate (LiFePO4) battery chemistry may be used, as in this example. The second battery 126 in this example has a cylindrical shape, with a diameter of 10 mm and a length of 37 mm. This battery is able to undergo 8000 cycles of charge/discharge at more than 900 J per cycle. The average charging rate may be up to 12 C. A charging rate of 1 C means that the battery is fully charged from zero charge to full charge in one hour and a charging rate of 2 C means that the battery is fully charged from zero charge to full charge in half an hour. The battery capacity is in the region of 125 mAh. The maximum charging current can range from 980 mA to 1.5 A. Discharging is performed using 1 millisecond pulses of up to 2 A. Discharge rate depends on the resistance of the heater, which is in turn dependent of the heater temperature. At ambient temperature the discharge rate may be as high as 28 C but is reduced at higher temperatures as the resistance of the heater increases. At typical operating temperature the discharging rate is around 13 C. As an alternative, a lithium titanate battery may be used for the second battery.

The first battery 106 in the primary unit 100 is a lithium cobalt oxide (LiCoO2) battery of the prismatic type. The first battery has a capacity of around 1350 mAh, over ten times the capacity of the second battery. The second battery may be charged from the first battery at a rate between 2 C and 16 C. Discharging the first battery at a rate of 1 C provides a charging rate of over 10 C to the second battery. Charging of the first battery can be performed from a mains supply, at a rate between 0 and 1.5 C, and typically at a rate of around 0.5 C to maximise battery life.

A lithium cobalt oxide battery provides a higher battery voltage than lithium iron phosphate, allowing the charging of a lithium iron phosphate battery from a single lithium cobalt oxide battery.

Figure 2:
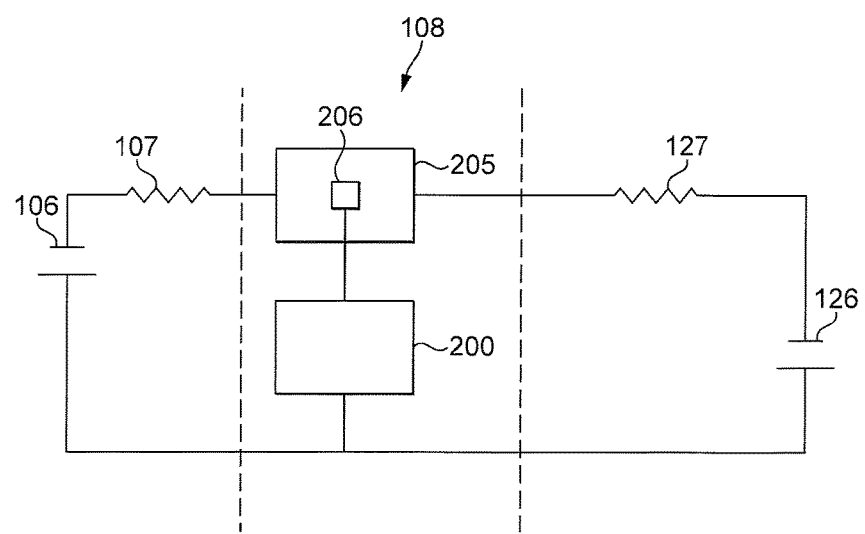
FIG. 2 is a circuit diagram illustrating a charging system in accordance with the disclosure.

FIG. 2 is a schematic circuit diagram of the charging system. The first battery 106 has an associated internal resistance 107. Control electronics comprises a controller 200 and a switch mode power converter 205. The switch mode power converter 205 is connected between the first battery and the second battery. The controller 200 is configured to control the switching of a switch 206 within the switch mode power converter and thereby regulate the voltage and current applied to the second battery 126. The switch mode power converter 205 in this example is an integrated buck-boost converter.

Figure 3:
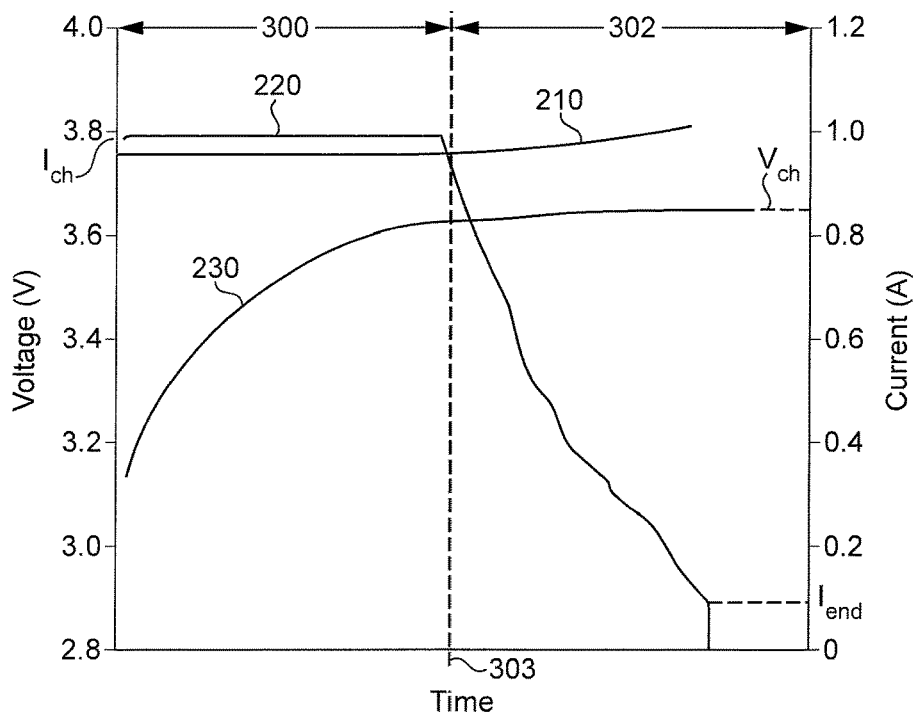
FIG. 3 illustrates a typical fast charging profile for a lithium ion battery.

FIG. 3 shows a standard charging profile for charging the second battery. FIG. 3 shows the charging voltage from the first battery 210, the charging current 220 from the charging device and the charging voltage 230 applied to the second battery being charged. The charging profile consists of an initial constant current phase 300. During the constant current phase 300 the charging voltage 230 is controlled so as to provide constant, maximum charging current Inn. This is achieved by switching the switch mode power converter on to apply a voltage pulse from the first battery to the power converter at a maximum duty cycle. This provides for the maximum rate of charging. However, the constant charging current phase 300 comes to an end when the charging voltage from the first battery that is required to maintain the maximum charging current exceeds a maximum charging voltage $V_{ch}$. $V_{ch}$ is set at a level that preserves the lifetime of the second battery. Once this stage is reached, indicated at time 303 on FIG. 3, a constant voltage phase 302 begins. During the constant voltage phase the charging voltage 230 is held at the maximum $V_{ch}$. During the constant voltage phase, the charging current 220 drops as the difference between the charging voltage 230 and battery voltage of the second battery drops. The charging process is stopped when the charging current 220 reaches a low threshold $I_{end}$. The maximum charging current and the maximum charging voltage are set by the battery manufacturer.

The charging profile illustrated in FIG. 3 can be used in a system as described with reference to FIG. 1. However, in a battery to battery charging system, as the charging battery ages, its internal resistance 107 increases, and the voltage that it can deliver is therefore reduced. But for the fastest charging, in the constant current phase the charging voltage from the first battery must be able to reach the maximum charging voltage $V_{ch}$. Otherwise the fast charging process cannot be completed. Accordingly, in prior systems, when the first battery can no longer deliver the minimum voltage required for the fast charging process it has to be recharged or replaced.

Figure 4:
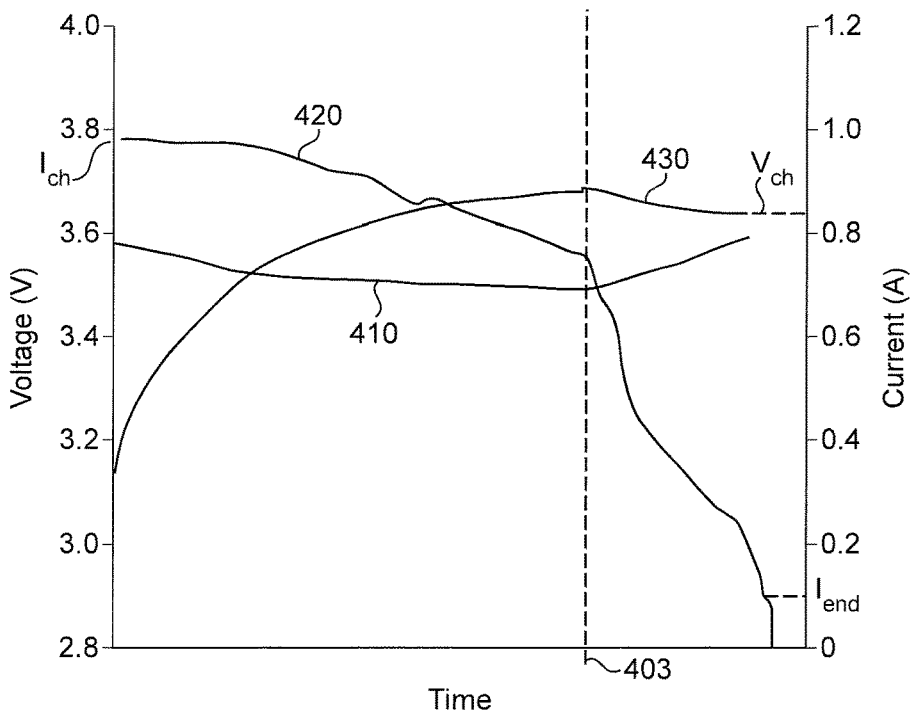
FIG. 4 illustrates a modified charging profile in accordance with the disclosure.

FIG. 4 illustrates a charging profile in accordance with an embodiment of the invention. In FIG. 4, the battery voltage from the first battery is reduced as compared with FIG. 3 because the first battery has aged and has a larger internal resistance. In FIG. 4 it can be seen that the charging current 420 drops before the charging voltage 430 reaches its maximum $V_{ch}$, i.e. before the constant current phase would ordinarily end. The charging current 420 is reduced in order to maintain the charging voltage 430 at the required level. This is done by adjusting the current to keep the battery voltage 410 output from the first battery above a preset threshold level of 3.5 Volts. When the charging voltage 430 reaches $V_{ch}$ the charging current is reduced further in order to maintain the charging voltage at or below $V_{ch}$. The process again ends when the charging current is reduced to $I_{end}$.

Figure 5:
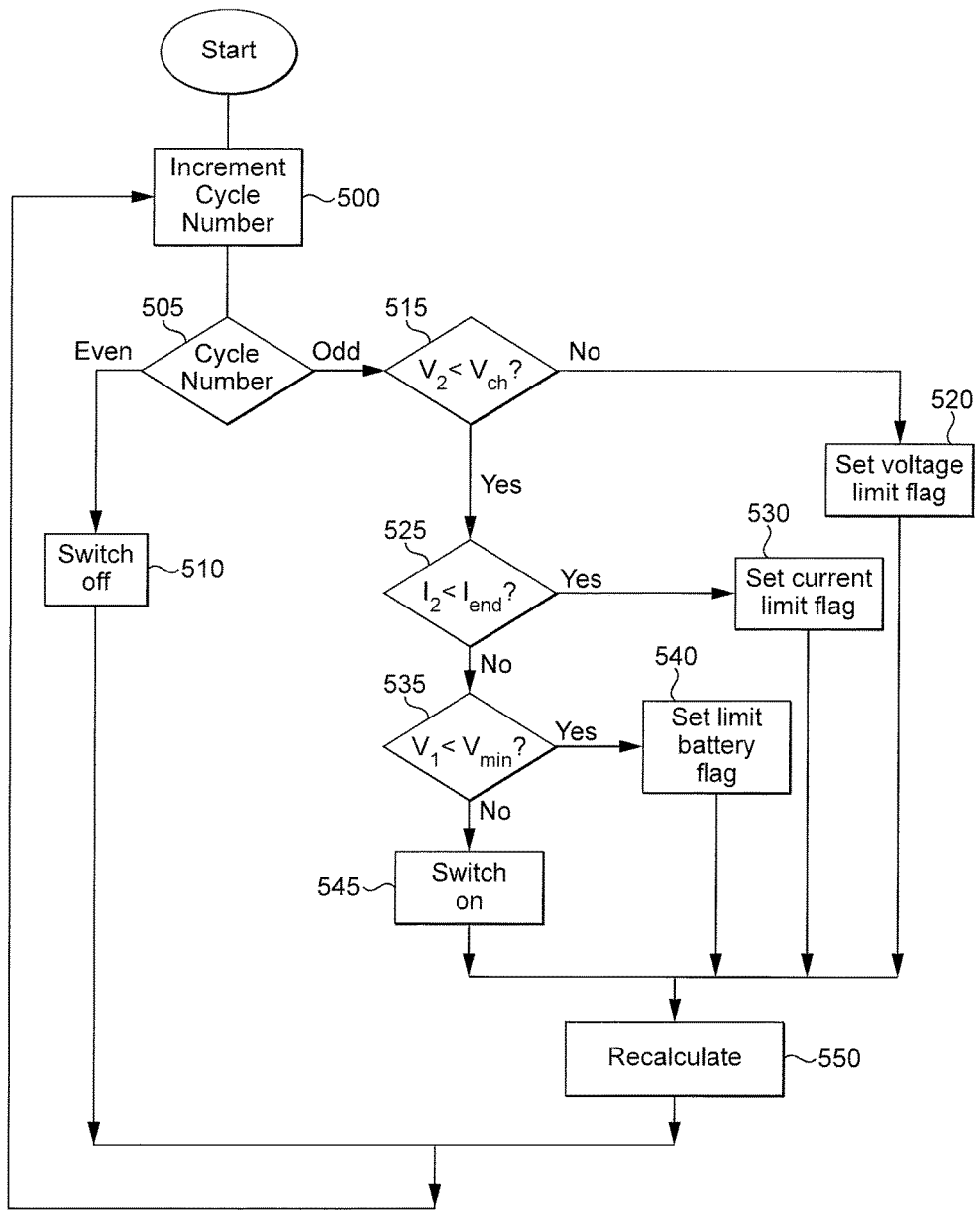
FIG. 5 is a flow diagram illustrating a control process for the charging profile of FIG. 4.

FIG. 5 illustrates a control process used to regulate the current in accordance with the profile shown in FIG. 3 or FIG. 4. The process starts with step 500, in which a count of the number of cycles of the process is incremented by one. Then, in step 505 it is determined if the count has reached an odd number or an even number. If it is an even number the process continues to step 510, in which the processor switches off the switch in the switch mode power converter so that no energy is accumulated in the switch mode power converter from the first battery. The process then returns to step 500 in which the cycle count is incremented by one.

Then in step 505 it is determined that the count has reached an odd number and the process proceeds to step 515. In step 515 it is determined whether the charging voltage applied to the second battery has reached the maximum permitted voltage $V_{ch}$. If it has reached the target voltage then the switch in the power converter remains off as the charging current needs to be reduced to reduce the charging voltage. The process then proceeds to step 520, in which a voltage limit flag is set within the processor, so that an indication that the constant current phase has ended can be provided to a user.

If the charging voltage applied to the second battery is less than the maximum voltage then the process proceeds to step 525. In step 525, the current to the second battery is compared with a target current, $I_{end}$, below which the charging process should be stopped, as seen in the charging profiles of FIGS. 3 and 4. If the charging current is below the target current, the process proceeds to step 530, in which a current limit flag is set. The current limit flag is used to indicate to the end user that charging is complete.

If the charging current is greater than the target current then the process proceeds to step 535. In step 535 it is determined whether the voltage from the first battery is greater than the minimum required voltage for fast charging. If the battery voltage of the first battery is greater than the minimum required voltage, then, in step 545, the processor switches on the switch in the switched mode power converter so that electrical energy is drawn from the first battery and is accumulated in the power converter for application to the second battery. If the battery voltage of the first battery is not greater than the minimum required voltage, then, the switch in the switch mode power converter remains off and, in step 540, the processor sets a limit battery flag so that an indication that the first battery needs recharging or replacing can be provided to the end user.

After each of steps 520, 530, 540 and 545, the process proceeds to step 550. In step 550 new measurements of the voltage of the first battery and second battery are taken and a new measurement of the charging current is taken. These measurements are then converted into digital form ready for comparison with the corresponding target values in the next odd numbered cycle.

In the next even numbered cycle, in step 510, the switch in the switch mode power supply is switched off and energy accumulated in the switch mode power supply is applied as a charging current to the second battery. If during the preceding cycle the switch has been switched to an on state in step 545 the voltage output to the second battery will be at a higher level than if the switch has not been switched to an on state during the preceding cycle. A lower output voltage means that a lower current is drawn from the first battery. Drawing a lower current from the first battery has the effect of increasing the battery voltage from the first battery, as less voltage is dropped across the internal resistance of the first battery. As can be seen in the profile of FIG. 4, when the minimum required target voltage is 3.5 Volts, this scheme has the effect of maintain the battery voltage of the first battery at around 3.5 Volts as the current drops. The process in FIG. 5 also ensures than no charging current is applied to the second battery when it is fully charged.

This process allow the first battery to recharge the second battery for a few more times than it would otherwise be able to using a standard fast charge process of constant current followed by constant voltage. This comes at the cost of charge speed for those extra charge cycles, but in many cases the extra charging cycles are of great benefit to the user in terms of convenience. The process is energy efficient compared with methods that simply try to raise the first battery voltage using a power converter as it suffers from relatively lower losses.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. A method of charging a second battery in an electronic smoking device from a first battery in a charging device, comprising:
    periodically comparing an output voltage of the first battery with a first threshold voltage during charging of the second battery;
    when the output voltage of the first battery is equal to or greater than the first threshold voltage, charging the second battery using a current; and
    when the output voltage of the first battery is less than the first threshold voltage, reducing the current used to charge the secondary battery until the output voltage of the first battery is equal to or greater than a second threshold voltage.

2. The method according to claim 1, wherein the second threshold voltage is equal to the first threshold voltage.

3. The method according to claim 1,
    wherein the reducing the current comprises not applying a voltage pulse to a power converter connected between the first battery and the second battery after an outcome of the comparing.

4. The method according to claim 1, further comprising, when the output voltage of the first battery is equal to or greater than the first threshold voltage, holding constant the current used to charge the second battery, and reducing the current when either a charging voltage applied to the second battery reaches a maximum permitted voltage or the output voltage of the first battery is less than the first threshold voltage.

5. The method according to claim 1, wherein, when a charging voltage applied to the second battery reaches a maximum permitted voltage or the output voltage of the first battery is less than the first threshold voltage, reducing the current to maintain the charging voltage applied to the first battery substantially at the maximum permitted voltage.

6. A method of charging a second battery in an electronic smoking device from a first battery in a charging device, comprising:
    comparing an output voltage of the first battery with a first threshold voltage;
    when the output voltage of the first battery is equal to or greater than the first threshold voltage, charging the second battery using a current; and
    when the output voltage of the first battery is less than the first threshold voltage, reducing the current until the output voltage of the first battery is equal to or greater than a second threshold voltage,
    wherein the reducing the current comprises reducing a duty cycle of voltage pulses applied to a power converter connected between the first battery and the second battery.

7. A charging device, comprising:
    a first battery configured to charge a secondary battery in an electronic smoking device connected to the charging device; and
    control circuitry configured to:
        control charging of the secondary battery,
        periodically compare an output voltage of the first battery with a first threshold voltage during charging of the second battery,
        if the output voltage of the first battery is equal to or greater than the first threshold voltage, charge the second battery using a current, and
        if the output voltage of the first battery is less than the first threshold voltage, reduce the current used to charge the second battery until the output voltage of the first battery is equal to or greater than a second threshold voltage.

8. The charging device according to claim 7, wherein the control circuitry is further configured to, when the output voltage of the first battery is equal to or greater than the first threshold voltage, holding constant the current used to charge the second battery, and reduce the current when either a charging voltage applied to the second battery reaches a maximum permitted voltage or the output voltage of the first battery is less than the first threshold voltage.

9. The charging device according to claim 8, wherein the control circuitry is further configured to reduce the current to maintain the charging voltage applied to the first battery substantially at the maximum permitted voltage when the charging voltage applied to the second battery reaches the maximum permitted voltage or the output voltage of the first battery is less than the first threshold voltage.

10. The charging device according to claim 7, wherein the control circuitry is further configured to reduce the current by not applying a pulse of voltage to a power converter connected between the first battery and the second battery after an outcome of the periodically comparing.

11. A charging device, comprising:
   a first battery configured to charge a secondary battery in an electronic smoking device connected to the charging device;
   a power converter connected between the first battery and the second battery; and
   control circuitry configured to:
      control charging of the secondary battery,
      compare an output voltage of the first battery with a first threshold voltage,
      if the output voltage of the first battery is equal to or greater than the first threshold voltage, charge the second battery using a current,
      if the output voltage of the first battery is less than the first threshold voltage, reduce the current until the output voltage of the first battery is equal to or greater than a second threshold voltage, and
      reduce the current by reducing a duty cycle of voltage pulses applied to the power converter.

12. A non-transitory computer readable storage medium having a computer program stored thereon, which, when run on programmable electric circuitry for an electronic smoking device, causes the programmable electric circuitry to perform a method of charging a second battery in the electronic smoking device from a first battery in a charging device, comprising:
   periodically comparing an output voltage of the first battery with a first threshold voltage during charging of the second battery;
   when the output voltage of the first battery is equal to or greater than the first threshold voltage, charging the second battery using a current; and
   when the output voltage of the first battery is less than the first threshold voltage, reducing the current used to charge the second battery until the output voltage of the first battery is equal to or greater than a second threshold voltage.

* * * * *